(12) United States Patent
Zoualfaghari

(10) Patent No.: US 10,637,601 B2
(45) Date of Patent: *Apr. 28, 2020

(54) COMMUNICATIONS NETWORK

(71) Applicant: British Telecommunications Public Limited Company, London (GB)

(72) Inventor: Mohammad Zoualfaghari, London (GB)

(73) Assignee: British Telecommunications Public Limited Company, London (GB)

( * ) Notice: Subject to any disclaimer, the term of this patent is extended or adjusted under 35 U.S.C. 154(b) by 16 days.

This patent is subject to a terminal disclaimer.

(21) Appl. No.: 15/525,864

(22) PCT Filed: Nov. 10, 2015

(86) PCT No.: PCT/EP2015/076235
§ 371 (c)(1),
(2) Date: May 10, 2017

(87) PCT Pub. No.: WO2016/075153
PCT Pub. Date: May 19, 2016

(65) Prior Publication Data
US 2017/0324503 A1 Nov. 9, 2017

(30) Foreign Application Priority Data
Nov. 10, 2014 (EP) .................................. 14192570

(51) Int. Cl.
*H04J 14/00* (2006.01)
*H04B 7/26* (2006.01)
*H04J 13/16* (2011.01)

(52) U.S. Cl.
CPC .......... *H04J 14/005* (2013.01); *H04B 7/2628* (2013.01); *H04J 13/16* (2013.01)

(58) Field of Classification Search
None
See application file for complete search history.

(56) References Cited

U.S. PATENT DOCUMENTS 6,014,376 A  1/2000 Abreu et al.
7,702,240 B2  4/2010 Minato
(Continued)

FOREIGN PATENT DOCUMENTS

CN  103873410 A  6/2014
FR    2972322 A1  9/2012
(Continued)

OTHER PUBLICATIONS

Jian-Guo Zhang, High speed optical fiber networks using code division multiple access for furture real time computer communication, dated Jul. 1996, IEICE Trans Commun, vol. E79-8, pp. 923-931.*

(Continued)

*Primary Examiner* — Kouroush Mohebbi
(74) *Attorney, Agent, or Firm* — Patterson Thuente Pedersen, P.A.

(57) ABSTRACT

A fixed communication network is disclosed in which a plurality of transmitters feed signals via tributary transmission lines of different lengths onto a shared network component. A timing reference signal is distributed to the transmitters. The shared network component in some embodiments takes the form of a transmission line. In order to enable the sharing of the capacity of the shared network component, each of the plurality of transmitters codes data for transmission in accordance with a code division multiple access scheme. The efficiency of usage of the shared network component is improved by synchronizing the arrival of the encoded bits at the shared network component. This is achieved by populating a store within each transmitter with a pre-set timing offset, and timing the transmission of data (Continued)

in accordance with the timing reference signal received by the transmitters and the pre-set timing offset.

10 Claims, 8 Drawing Sheets

(56) References Cited

U.S. PATENT DOCUMENTS

| | | | |
|---|---|---|---|
| 10,021,662 | B2 | 7/2018 | Virginas et al. |
| 2002/0009074 | A1 | 1/2002 | Iwahori et al. |
| 2004/0047330 | A1 | 3/2004 | Matsuno et al. |
| 2007/0249291 | A1 | 10/2007 | Nanda et al. |
| 2010/0054237 | A1 | 3/2010 | Han et al. |
| 2010/0097601 | A1 | 4/2010 | Bato et al. |
| 2012/0236977 | A1 | 9/2012 | Zou et al. |
| 2014/0169247 | A1 | 6/2014 | Jafarian et al. |
| 2015/0043398 | A1 | 2/2015 | Fwu et al. |
| 2016/0192278 | A1 | 6/2016 | Ji et al. |
| 2017/0324444 | A1* | 11/2017 | Zoualfaghari ........ H04J 14/005 |

FOREIGN PATENT DOCUMENTS

| | | |
|---|---|---|
| WO | WO 98/09390 A1 | 3/1998 |
| WO | WO 2010/033286 A1 | 3/2010 |

OTHER PUBLICATIONS

International Search Report for corresponding International Application No. PCT/EP2015/076235 dated Jan. 27, 2016; 3 pages.
Written Opinion of the International Searching Authority for corresponding International Application No. PCT/EP2015/076235 dated Jan. 27, 2016; 7 pages.
Pruncal et al., "Spread spectrum fiber-optic local area network using optical processing," Journal of Lightwave Technology (May 1986) vol. LT-4, No. 5; p. 547-554.
Zhang, Jian-Guo, "High-speed optical fiber networks using code-division multiple access for future real-time computer communications," IEICE Transactions on Communications (Jul. 25, 1996) vol. E79-B, No. 7; p. 923-931. XP000628626.
Zoualfaghari et al., "Uniform cross-correlation modified prime code for applications in synchronous optical CDMA communication systems," Journal of Lightwave Technology (Sep. 15, 2012) vol. 30, No. 18; p. 2955-2963.
Zoualfaghari et al., "A novel multi-user interference cancellation scheme for synchronous OCDMA networks," Journal of Lightwave Technology (Jun. 1, 2013) vol. 31, No. 11; p. 1813-1820. XP011507567.
International Search Report and Written Opinion for PCT Application No. PCT/EP2016/051562 dated Apr. 28, 2016; 10 pages.
International Preliminary Report on Patentability for PCT Application No. PCT/EP2016/051562 report completed on Jun. 26, 2017; 16 pages.
Abdalla et al., "Cluster-Based Multihop Synchronization Scheme for Femtocell Network", IIUM Engineering Journal (2012) vol. 13, No. 2; pp. 161-172.
Amin et al., "Network Listening based Synchronization Techniques for Femtocell Systems", 2011 IEEE $22^{nd}$ International Symposium on Personal, Indoor, and Mobile Radio Communication (PIMRC) Sep. 11-14, 2011; 5 pages.
Mehrpouyan et al., "A new distributed approach for achieving clock synchronization in heterogeneous networks", 2011 IEEE Global Telecommunications Conference (Globecom 2011) Dec. 5-9, 2011; 5 pages.
International Search Report and Written Opinion for PCT Application No. PCT/EP2015/076240 dated Jan. 28, 2016; 17 pages.
International Preliminary Report on Patentability for PCT Application No. PCT/EP2015/076240 dated May 16, 2017; 12 pages.
U.S. Appl. No. 15/525,825, filed May 10, 2017, Inventor(s): Zoualfaghari et al.
European Search Report for EP Application No. 15791648.7 dated Feb. 21, 2019; 7 pages.

* cited by examiner

COMMUNICATIONS NETWORK

CROSS-REFERENCE TO RELATED APPLICATIONS

The present application is a National Phase entry of PCT Application No. PCT/EP2015/076235, filed on 10 Nov. 2015, which claims priority to EP Patent Application No. 14192570.1, filed on 10 Nov. 2014, which are hereby fully incorporated herein by reference.

TECHNICAL FIELD

The present disclosure relates to a fixed communications network, a transmission system for use in a fixed communications network and a timing regulator for retro-fitting to existing fixed communications networks.

BACKGROUND

For reasons of efficiency, most telecommunication networks are not fully connected (i.e. there is not a separate line from each transmitter to each receiver). Instead, transmission lines are shared between a plurality of transmitter-receiver paths. Transmission lines include copper pairs, co-axial cables and optical fibers—the latter becoming predominant in modern fixed networks.

SUMMARY

According to a first aspect of the present disclosure, there is provided a fixed network comprising: a trunk transmission line; a plurality of tributary transmission lines; one or more signal couplers operable to couple the plurality of tributary transmission lines and the trunk transmission line; a plurality of transmitters each being operable to transmit a traffic data signal onto one of the tributary transmission lines, the traffic data signal representing traffic data encoded in accordance with a code division multiple access coding scheme; each transmitter having access to a pre-set time offset store and a timing signal; wherein each of the transmitters is arranged in operation to transmit the traffic data signals onto the tributary transmission line at a time dependent upon the timing signal and a pre-set time offset stored in the pre-set time offset store.

In a fixed network in which a plurality of transmitters transmit traffic data signals representing traffic data symbols encoded in accordance with a code-division multiple access (CDMA) scheme along tributary transmission lines to a trunk transmission line via one or more signal couplers coupling the trunk transmission line and the tributary transmission lines, by appropriately pre-setting a time offset for each transmitter in a time offset store accessible to the transmitter, and operating each of the plurality of transmitters to transmit a traffic data signal at a time dependent upon a timing signal and the pre-set time offset, the traffic data signals representing each encoded traffic data symbol are synchronized on the trunk transmission line, thereby reducing, for each of one or more receivers, the amount of unwanted cross-correlation between traffic data signals encoded with the CDMA code applied to the current transmission to that receiver and data traffic signals encoded with other CDMA codes. The reduction in unwanted cross-correlation leads to an increase in the number of traffic data signals which can be simultaneously and successfully carried on the trunk transmission line. Furthermore, the use of a stored pre-set time offset takes advantage of the path lengths in the fixed network being fixed.

In some embodiments, the fixed network has a bus network topology in which each of the transmitters is coupled (perhaps by a short tributary transmission line) to a single transmission line (the trunk transmission line). In other embodiments, the fixed network has a tree topology in which the trunk transmission line is connected to a plurality of transmitters via one or more branching points, each branching point being provided by a signal coupler. In yet other embodiments, relatively long tributary transmission lines form a tree topology which connects many terminals to a single head-end which includes a (possibly relatively short, perhaps even contained with the head-end) transmission line shared by the paths to the head-end from all the terminals. In yet other embodiments, the fixed network has a star network topology in which each of a group of transceivers is connected to a central coupler by a link—in cases where each link is bi-directional, each link is both a trunk transmission line (when the transceiver acts as a receiver), and a tributary transmission line (when the transceiver acts as a transmitter). In general, embodiments of the disclosure can form a variety of topologies in which the tributary transmission lines or trunk transmission line can be of various relative lengths.

In some embodiments, the trunk transmission line comprises a trunk optical fiber, the signal coupler comprises an optical coupler and the tributary transmission lines comprise tributary optical fibers.

In some embodiments, the timing signal comprises a clock signal. Using a clock signal provides the advantage that the complexity of the transmitters is reduced since they need not include an internal clock signal generator of sufficient accuracy to achieve the benefits of improved synchronization of traffic data signals in the trunk transmission line. In alternative embodiments, an occasional timing signal might be sent by a timing signal source, perhaps in response to a request for a timing signal from one of the transmitters, or perhaps in response to the degree of synchronization of the traffic data symbols on the trunk transmission line falling below a predetermined level.

In one embodiment, the period of said clock signal is equal to the symbol rate of the traffic to be encoded by each of the transmitters.

According to a second aspect of the present disclosure, there is provided a transmission system for use in a fixed communications network which has a plurality of tributary transmission lines coupled by one or more signal couplers to a trunk transmission line, the transmission system comprising: a modulator for transmitting a traffic data signal, representing traffic data encoded in accordance with a code division multiple access coding scheme, onto one of the plurality of tributary transmission lines; a timing regulator having access to a timing signal and a pre-set time offset store, the timing regulator being operable to control the transmission system to output the traffic data signal at a time dependent on the timing signal and a pre-set time offset stored in the pre-set time offset store.

In some embodiments, the transmission system further comprises the pre-set time offset store.

In some embodiments, the transmission system further comprises an encoder operable to encode traffic data symbols in accordance with a code division multiple access coding scheme.

In some embodiments, the encoder is operable to encode each traffic data symbol using one of a set of codes, which set has the property that each subset of codes sums to a unique total. In some embodiments, the codes are optical codes (i.e. do not include negative values). In some embodiments, the set of optical codes are a set of prime codes. One example of a suitable code is the Uniform Cross-Correlation Modified Prime Code introduced in a paper entitled 'Uniform Cross-Correlation Modified Prime Code for Applications in Synchronous Optical CDMA Systems', by the present inventor and H. Ghafouri-Shiraz, in the IEEE Journal of Lightwave Technology, vol. 30, no. 18, Sep. 15, 2012. In systems where the encoded traffic data is binary data, and each '1' bit is encoded as the code associated with the intended receiver, and each '0' bit is encoded as a string of zeroes and hence does not contribute to the traffic data signal, the sum of the traffic data signals on the trunk transmission line indicates which receivers are intended to receive a coded '1' bit in the current bit period. This can be used to suppress signals to receivers which are not intended recipients of a coded '1' bit in the current bit period, and thus further reduce the chance of a receiver making an error in decoding the superposition of traffic data signals presented to it. This provides a yet further improvement in the capacity of the trunk transmission line.

In some embodiments, the timing regulator is arranged to receive the traffic data symbols and to delay the input of the traffic data to the encoder to a time dependent upon the timing signal.

This enables simple apparatus to provide the necessary synchronization of the CDMA signals. It is advantageous in situations where unsynchronized CDMA transmitters are already in operation, providing a straightforward upgrade to synchronized CDMA transmission.

In alternative embodiments, the timing regulator is arranged to receive the encoded traffic data, and to delay the output of the encoded traffic data to said modulator until a time dependent upon the timing signal.

In either case, the timing regulator in some embodiments comprises: a buffer; and a buffer controller arranged in operation to buffer traffic data symbols or encoded traffic data until a time dependent upon the timing signal, whereupon the traffic data symbols or encoded traffic data respectively are passed to the encoder or the modulator, respectively.

To enable the straightforward upgrade mentioned above, according to a third aspect of the present disclosure there is provided a timing regulator for use in association with one of a plurality of transmitters in a fixed communications network comprising a trunk transmission line, a plurality of tributary transmission lines, and one or more signal couplers operable to couple the plurality of tributary transmission lines and the trunk transmission line, the transmitter being operable to transmit a traffic data signal onto one of the tributary transmission lines, the traffic data signal representing traffic data encoded in accordance with a code division multiple access coding scheme, the timing regulator comprising: a traffic data signals input interface; a traffic data signals output interface; a timing signal input interface; wherein the timing regulator has access to a pre-set time offset store, receives a timing signal via the timing signal input interface, and is operable to receive input traffic data signals via the input interface and to control the transmitter to output traffic data signals from the traffic data signals output interface at a time dependent on the timing signal and a pre-set time offset stored in the pre-set time offset store.

BRIEF DESCRIPTION OF THE DRAWINGS

There now follows, by way of example only, a description of one or more embodiments of the disclosure. This description is given with reference to the accompanying drawings, in which.

DETAILED DESCRIPTION

Figure 1:
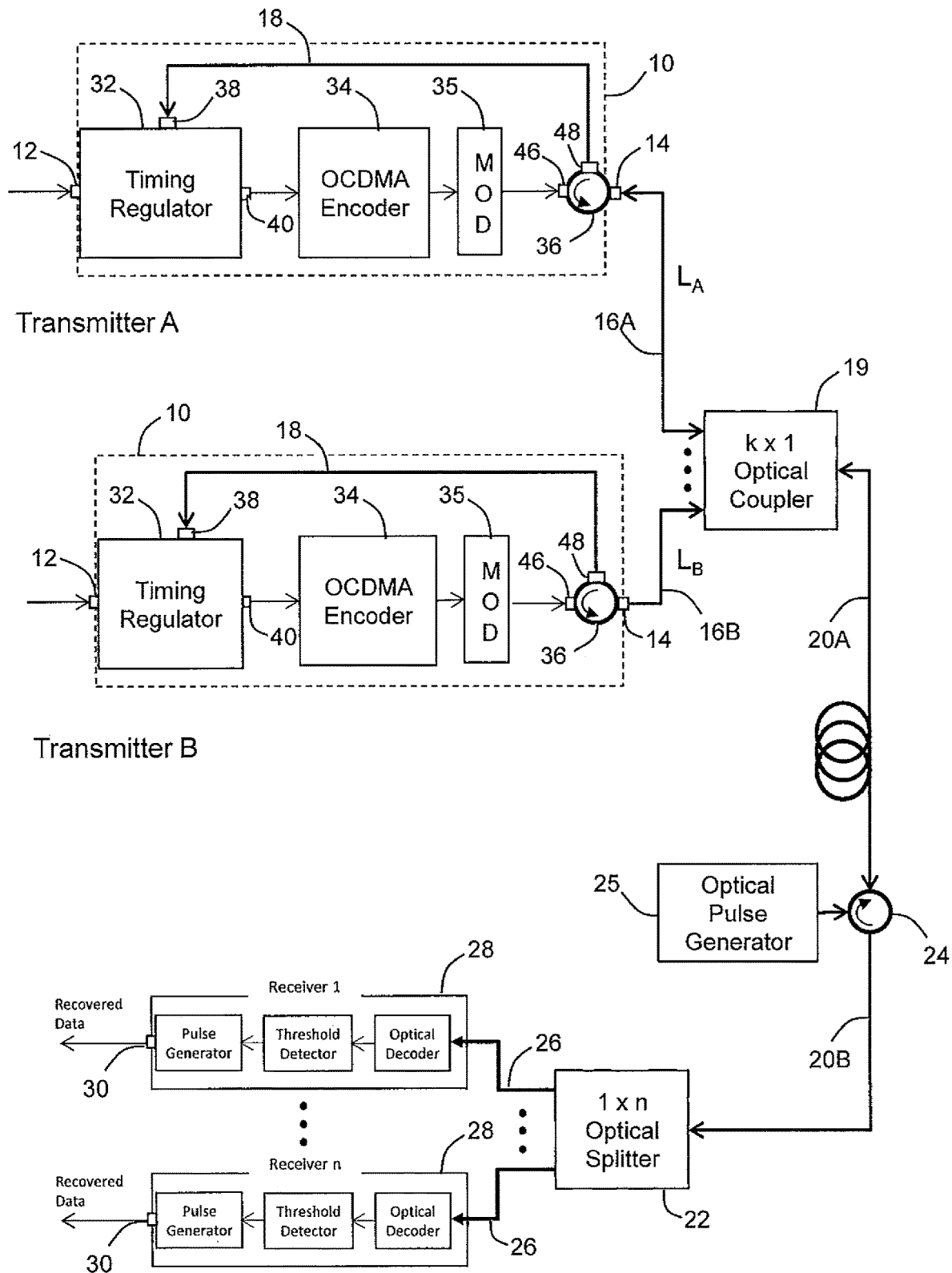
FIG. 1 shows a communications network in which the capacity of an optical fiber is shared between a plurality of transmission systems.

A communications network (FIG. 1) comprises a plurality of transmission systems 10, each of which has an addressed traffic data input 12 and an Optical Code Division Multiple Access (OCDMA) signal output 14. The OCDMA signal output 14 of each transmitter system 10 is connected by a feed-in optical fiber 16 to a k×1 optical coupler 19. In this embodiment, the feed-in optical fiber 16A from transmission system A has a length $L_A$ which is longer than the length $L_B$ of the feed-in optical fiber 16B from transmission system B. There are k transmission systems 10 in the network, one of which (not shown) has a feed-in fiber of a length $L_{MAX}$ greater than the length of each of the other feed-in fibers. The k×1 optical coupler 19 is connected via the upstream section 20A of a shared optical fiber 20 to a shared three-port optical circulator 24. A downstream section 20B of the shared optical fiber 20 connects the shared three-port optical circulator to a 1×n optical splitter 22. The 1×n optical splitter 22 is in turn connected by a plurality of feed-out optical fibers 26 to respective receivers 28. Each receiver has an output 30 at which it generates a signal representing the traffic data addressed to that receiver received via the input port 12 of one of the transmitter systems 10.

The upstream section 20A of the shared fiber 20 terminates on a first port of the shared three-port optical circulator 24. The downstream section 20B of the shared fiber 20 is connected to a second port of the shared three-port optical circulator 24 and an optical pulse generator 25 is connected to the third port of the shared three-port optical circulator 24. As indicated by the clockwise direction of the circular arrow in the diagram, the shared optical circulator is configured to selectively pass any signal present on the upstream section 20A of the shared optical fiber 20 to the downstream section 20B, and to selectively pass any signal from the optical pulse generator 25 to the upstream section 20A of the shared optical fiber 20.

Each of the transmission systems 10 comprises a timing regulator 32, an OCDMA encoder 34 and a modulator 35 (these might be provided by a conventional unsynchronized Optical Code Division Multiple Access (OCDMA) transmitter) and a transmission-side optical circulator 36. A feed-in branch fiber 18 connects the transmission-side optical circulator 36 to the timing regulator 32. In this embodiment, the feed-in branch fibers 18 are all of substantially the same length. The timing regulator 32 includes the addressed traffic data input 12 mentioned above, a synchronized addressed traffic data output 40 which is connected to the input of the OCDMA encoder 34, and an input 38 from the feed-in branch fiber 18. The output of the OCDMA encoder 34 is fed to the modulator 35 which is in turn connected to an OCDMA signal input port 46 of the transmission-side optical circulator 36.

The transmission-side optical circulator 36 has three ports: the OCDMA signal input port 46 just mentioned, a feed-in branch fiber port 48, and the previously-mentioned OCDMA signal output 14 of the transmission system 10. As indicated by the anti-clockwise direction of the circular arrow in the diagram, the transmission-side optical circulator 36 is configured to add OCDMA signals arriving at the OCDMA signal input port 46 to the feed-in fiber 16, and thus on via the k×1 optical coupler 19 to the shared optical fiber 20. Also, the transmission-side optical circulator 36 is configured to optically connect the feed-in fiber 16 to the feed-in branch fiber 18.

In operation, two different types of optical signals are generated within the communications network.

The first type is an OCDMA signal generated by each of modulators 35. As will be understood by those skilled in the art, the OCDMA signal will result from the application of a so-called chip sequence (a code) to each '1' bit of the traffic data. The chip-sequence used depends upon the receiver to which the encoded traffic data is to be sent. The OCDMA encoder 34 identifies the receiver to which the encoded data is to be sent from the address included within the addressed traffic data. Since each bit is encoded using a chip sequence of many bits, the OCDMA signal generated by the modulator 35 has a 'chip-rate' which is many times higher than the bit-rate of the original digital traffic data.

In this embodiment, the modulator modulates a laser source of light of 1.55 μm wavelength.

The OCDMA signals are passed onto the feed-in fiber 16 and are combined by the k×1 optical coupler 19, passed onto the upstream section 20A of the shared fiber 20, around the shared optical circulator 24 and on to the 1×n optical splitter 22. From there a fraction of the combined OCDMA signals is passed via the feed-out fibers 26 to respective receivers 28.

Each receiver then extracts the component of the combined CDMA optical signals intended for it by using the chip sequence of the receiver, and outputs the traffic data via the traffic data output port 30.

The second type of optical signal generated within the network is an optical timing signal generated by the optical pulse generator 25 at the bit-rate of the traffic data received by each transmission system 10. In this embodiment, this signal is generated by on-off keying of a laser generating light of a wavelength of 1.3 μm.

Owing to the configuration of the optical network described above, the optical timing signal is present in operation on the upstream section 20A of the shared fiber, and a fraction of the optical timing signal is present on each of the feed-in fibers 16 and each of the feed-in branch fibers 18.

It will be realized from the above description that the optical signal present on the upstream section 20A of the shared fiber and each of the feed-in fibers 16 and feed-in branch fibers 18 will consist of a superposition of OCDMA signals and the optical timing signal. The spectra of the two signals will be separate from one another—in effect, they are frequency-division multiplexed on the upstream section 20A of the shared fiber.

Figure 2:
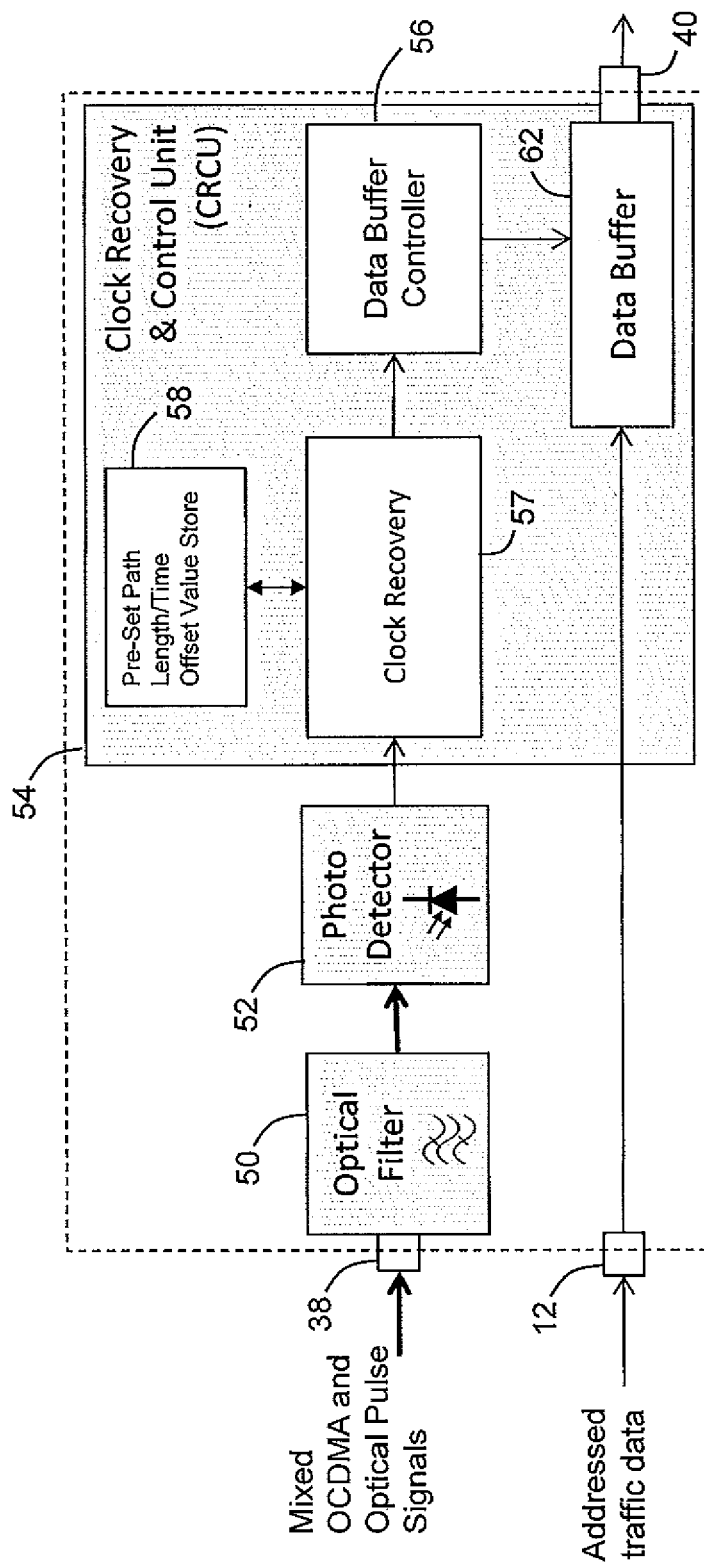
FIG. 2 shows the structure of a timing regulator unit included within each of the plurality of transmission systems.

Turning now to FIG. 2, the timing regulator of each transmission system 10 receives the superposition of OCDMA signals and optical timing signal at feed-in branch fiber port 38.

The feed-in branch fiber port 38 is connected to an optical filter 50 which is a bandpass filter arranged to allow wavelengths close to the wavelength of the optical timing signal (in this embodiment, 1.3 μm) to pass, but to heavily attenuate other frequencies. The output of the optical filter 50 is fed to photo-detector 52, which also operates at the wavelength of the optical timing signal. The electrical output of the photo-detector 52 is in turn passed to clock recovery element 57 in the clock recovery and control unit (CRCU) 54. The CRCU and all of its components in this embodiment are implemented in a Xilinx Spartan-6 field-programmable gate array (FPGA) and consist of clock recovery 57, pre-set path length/time offset value store 58, data buffer controller 56 and data buffer 62 elements.

The CRCU 54 has a store 58 storing a time delay set at the time the transmitter is set up as will be explained below. The clock recovery unit 57 receives the electrical clock signal from the photo detector 52. It delays that electrical clock signal by an amount corresponding to the time delay stored in store 58. The output of the clock recovery element 57 is thereby synchronous with the clock signal seen at the optical pulse generator 25.

The CRCU 54 also has a data buffer 62 for temporarily storing the addressed traffic data arriving via transmission system input 12. This buffer 62 is controlled by the data buffer controller unit 56, which uses the delayed clock signal from the clock recovery unit 57 to control the time at which each bit of traffic data is placed on the link to the OCDMA encoder 34.

Figure 3:
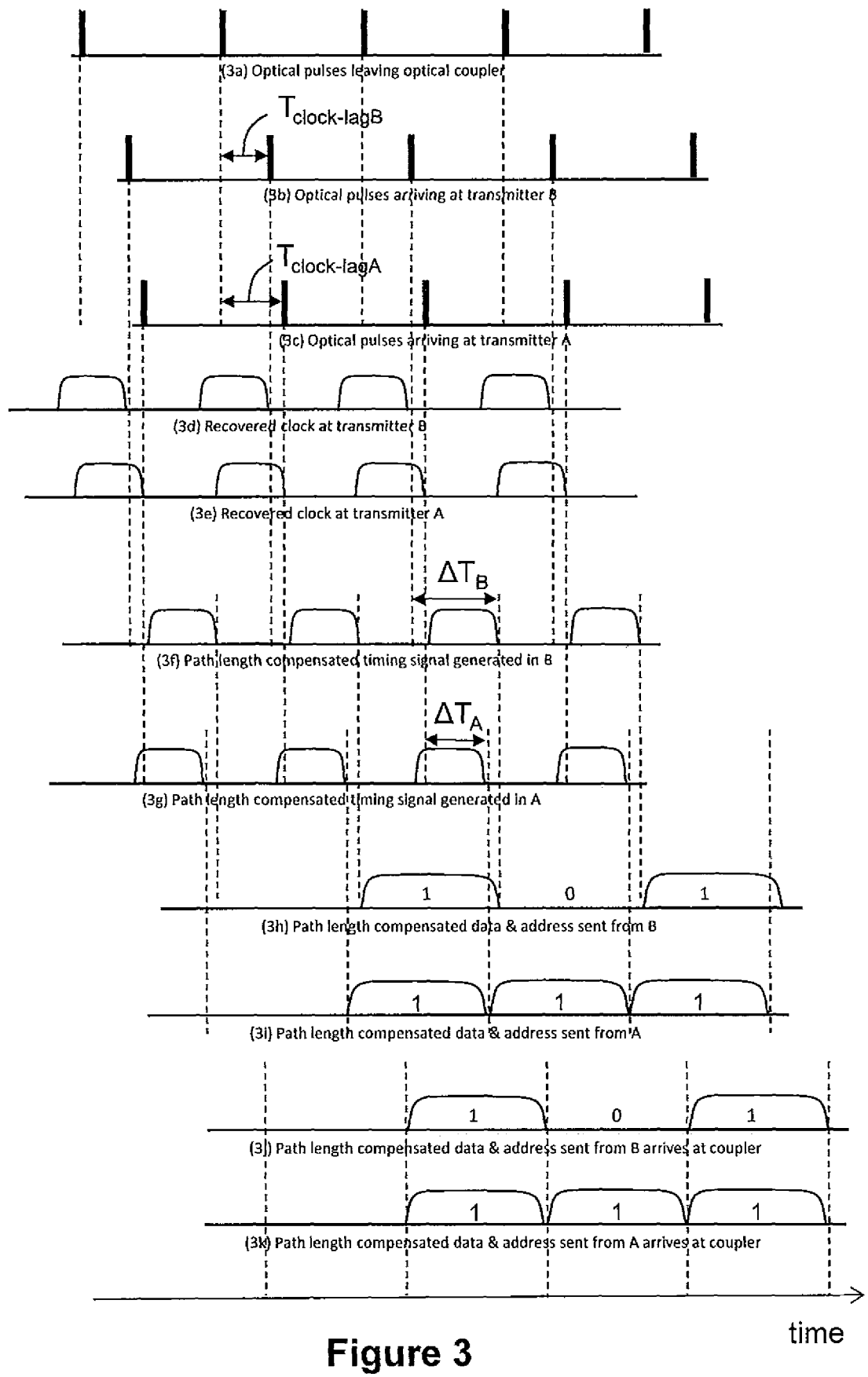
FIG. 3 is a timing diagram showing how timing regulator units in different transmitters delay the output of data by different time periods in order to align the arrival of data from different transmitters at a shared network element.

The relative timing of the signals present in each timing regulator 32 and elsewhere in the network are illustrated in FIG. 3. In each transmission system 10, the output of the bandpass filter 50 (which is dominated by the optical timing signal) is fed to photo-detector 52 which converts the pulses of the optical timing signal into an electrical signal. The pulse signal output by the optical filter in transmission system B (signal (3b)) lags the pulse signal output by the optical coupler 19 (signal (3a)) by a pulse lag time $T_{clock\text{-}lagB}$ equal to the time taken for the pulse signals to travel along the length of the feed-in fiber 16B. The pulse signal output by the optical filter in transmission system A (signal (3c)) lags the pulse signal output by the optical coupler 19 (signal (3a)) by a pulse lag time $T_{clock\text{-}lagA}$ equal to the time taken for the pulse signals to travel along the length of the feed-in fiber 16A. Because the feed-in fiber 16A is longer than the feed-in fiber 16B, each of the regular optical pulses leaving the coupler (signal (3a)) arrives at the transmission system B (signal (3b)) before arriving at the transmission system A (signal (3c)). In other words, T duration than T clock-lagB is of shorter $T_{clock\text{-}lagA}$.

In each transmission system, the clock recovery and control unit 54 takes the output of the photo-detector and generates a mesochronous clock signal having a period equal to the time period of each traffic data bit. It is to be understood that mesochronous means that whilst the frequency of the clock signals is identical in each of the transmission systems, the clock signals in the different transmission systems are not in phase with one another. The mesochronous clock signal is, in this example, a square wave whose falling edge coincides with the arrival of an optical pulse at the transmission system 10.

The falling edge of the mesochronous clock signal in transmission system B (signal (3d)) coincides with the position of each pulse in the regular pulse signal output by the optical filter 50 in transmission system B (signal (3b)). Similarly, the falling edge of the mesochronous clock signal in transmission system A (signal (3e)) coincides with the position of each pulse in the regular pulse signal output by the optical filter 50 in transmission system A (signal (3c)).

In this embodiment, on setting up a new transmission system 10, a network operator plugs an Optical Time Domain Reflectometer into the optical coupler 19 and measures the round trip time taken for a signal to travel from the reflectometer to the new transmission system 10 and back to the reflectometer. By way of example, in the case of transmission system A, the measured round trip time could be $RTT_A$, and that the round trip time measured for transmission system B could be $RTT_B$.

As part of the set-up procedure for each transmission system 10, the measured round trip time is stored in the pre-set length/time offset value store 58.

The data buffer controller 56 is arranged in operation to receive the mesochronous clock signal and delay it by an amount which is complementary to the round trip time stored in the store 58. One way of calculating a suitable complementary value for each transmission system 10 will now be explained with reference to FIG. 4.

Firstly, for each transmitter, calculate the offset required to delay the optical clock as seen at the transmitter (4(b), 4(e)) so that it is brought into synchrony with the optical clock as seen at the optical pulse generator 25. To calculate the offset initially a residue is calculated by dividing the measured round trip time for the transmitter by the clock period $T_{CLOCK}$, and finding the remainder. Secondly, for each transmitter, subtract this residue from the clock period ($T_{CLOCK}$), to calculate the stored pre-set time offset value to the next clock edge, for this transmission system (ΔT).

In the present example, the stored pre-set time offset value for transmission system A is:

$$\Delta T_A = T_{CLOCK} - (RTT_A \% T_{CLOCK})$$

as seen in 4(e) where $T_{CLOCK}$ is the period of the clock signal and % is the remainder operator.

The stored pre-set time offset value for transmission system B is:

$$\Delta T_B = T_{CLOCK} - (RTT_B \% T_{CLOCK})$$

as seen in 4(a).

Returning to FIG. 3, in transmission system B, the data buffer controller 56 delays the mesochronous clock signal by $\Delta T_B$ to provide an offset mesochronous clock signal (signal (3f)). In transmission system A, the data buffer controlled delays the mesochronous clock signal by $\Delta T_A$ to provide an offset mesochronous clock signal (signal (3g)).

Because the difference in round trip times $RTT_A$ and $RTT_B$ includes the difference in clock lags as well as the difference in the time taken for a transmission to travel along the return path to the coupler 19, the offset mesochronous clock signals over-compensate for the different clock lags. Hence, the offset mesochronous clock signal in transmission system A (signal (3g)) leads the offset mesochronous clock signal (signal (3f)) in transmission system B. It will be noted in a case such as this embodiment, where each transmission system 10 receives the clock signal from the coupler, the relationship between the offset mesochronous clock signals is the mirror image of the relationship seen between the mesochronous clock signals.

The bits of the addressed traffic data arriving at the data buffer 62 arrive with an indeterminate phase relationship to the offset mesochronous clock signal. The data buffer controller 56 delays the transmission of each bit from the data buffer 62 (and hence delays the arrival of each bit at the OCDMA encoder 34) until the falling edge of the next offset mesochronous clock signal.

Hence, transmission system A sends each bit of its traffic data to the encoder 34 in advance of transmission system B sending each bit of its traffic data to encoder 34. Because the difference in round trip times $RTT_A$ and $RTT_B$ includes both the difference in clock lags and the difference in transmission times from the transmission system 10 to the coupler 19, the amount of the advance is equal to the extra transmission time required for the OCDMA signals from transmission system A to reach the coupler 19 in comparison to the OCDMA signals from the transmission system B. In other words, each encoded bit from the transmission system A (signal (i)) is given a head start sufficient to ensure it arrives at the coupler 19 simultaneously with an encoded bit (signal (h)) from transmission system B, despite the encoded bit from the transmission system A having a greater distance to travel.

It will be seen how the encoded bit signals from transmitter A arrive at the coupler 19 (signal (3k)) time-aligned with the encoded bit signals from transmitter B (signal (3j)).

In this embodiment, the traffic data is encoded using the Uniform Cross-Correlation Modified Prime Code introduced in a paper entitled 'Uniform Cross-Correlation Modified Prime Code for Applications in Synchronous Optical CDMA Systems', by the present inventor and H. Ghafouri-Shiraz, in the IEEE Journal of Lightwave Technology, vol. 30, no. 18, Sep. 15, 2012.

As explained in 'Spread Spectrum Fiber-Optic Local Area Network Using Optical Processing', Pruncal, P. R. et al, IEEE Journal of Lightwave Technology, vol. LT-4, no. 5, May 1986, prime codes are good candidates for optical CDMA networks because the signal-to-noise ratio of an optical CDMA network which uses them increases in direct proportion to the increase in the number of chips included in each chip sequence (a '1' bit is normally encoded as the chip sequence, whereas a '0' bit is encoded as a series of as many zeroes as there are chips in the chip sequence). The large bandwidth available in optical CDMA systems allows many more chips per bit than in other CDMA systems.

The benefit of using Uniform Cross-Correlation Modified Prime Codes (UC-MPC) over using basic prime codes is that the cross-correlation between signals destined for different receivers is one for all pairs of codes in the set of codes, the number of chips per bit is increased, and the auto-correlation is increased by one. This allows an increase in the number of active simultaneous users which can be supported by the OCDMA network.

Figure 4:
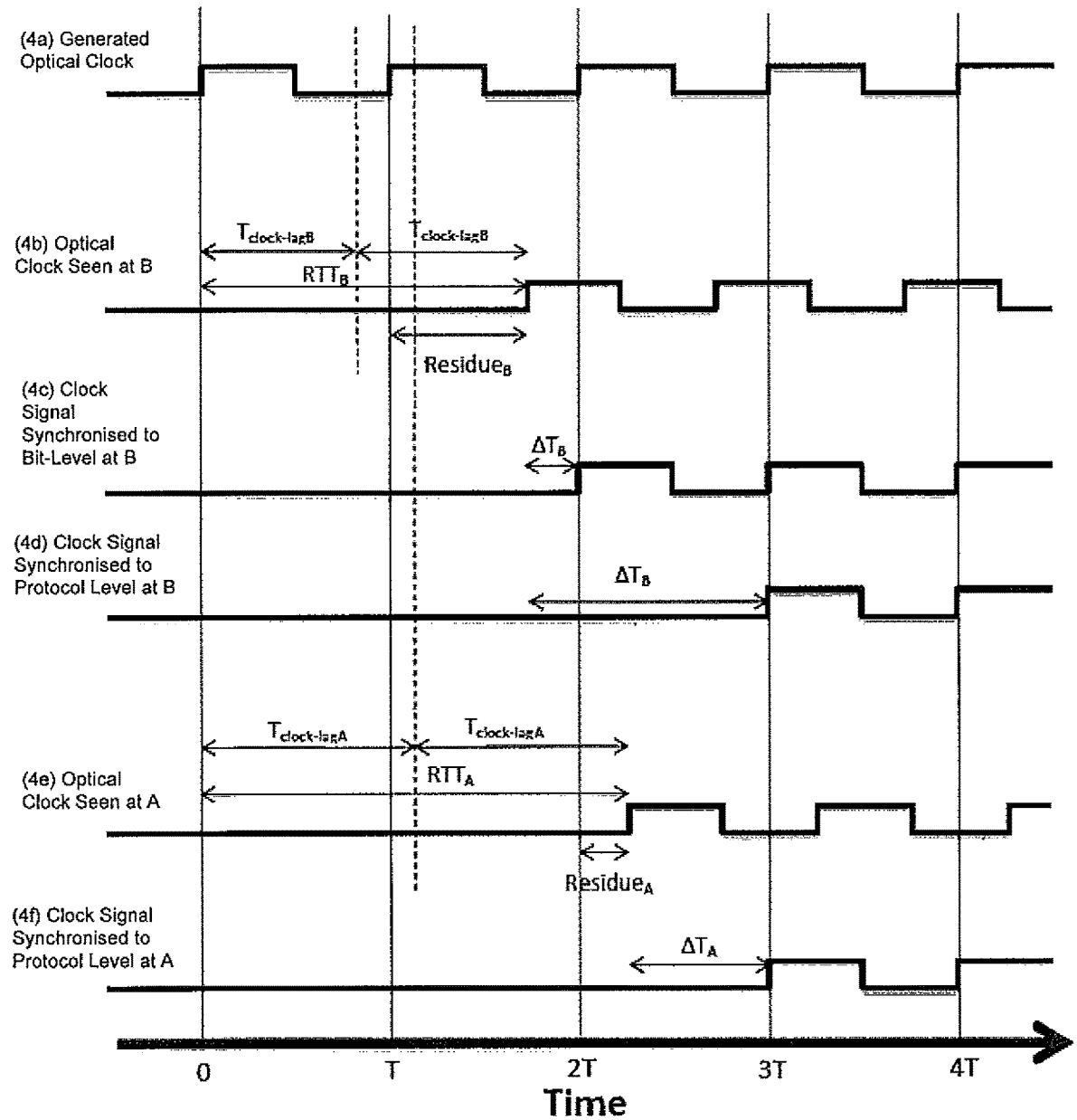
FIG. 4 is a timing diagram showing how the time offsets to provide bit synchronization and sequence synchronization are calculated.
Figure 5:
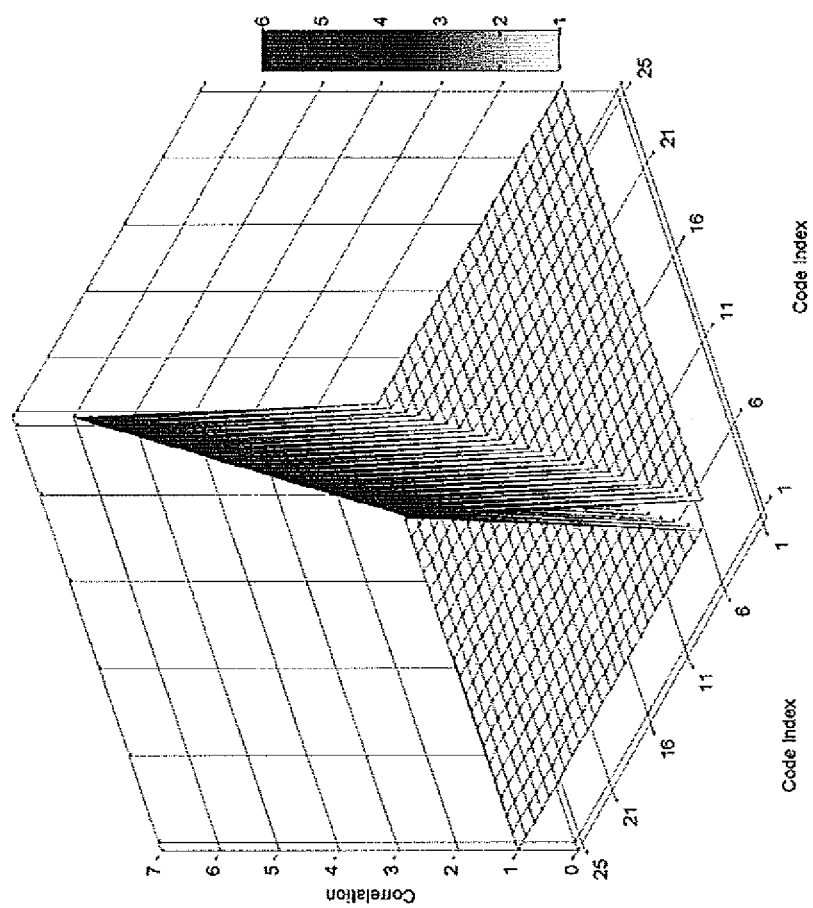
FIG. 5 illustrates the auto-correlation and cross-correlation of a particular set of 30-bit codes when encoded bits are aligned in time.

FIG. 4 shows the correlation properties between pairs of UC-MPC codes (of length $p^2+p$, where p=5 in this case) in the case where the chip sequences destined for different receivers are perfectly aligned in time. FIG. 5 shows how the cross-correlation can be considerably higher when the chip sequences are not aligned in time. Some of the worst cross-correlations can be avoided by not using all twenty-five of the available chip sequences, but this leads to a reduction in the number of simultaneous users who can be supported by the network.

Because, in the above embodiment a common optical timing signal is distributed to each of the transmission systems 10 via the same feed-in fibers which carry the transmissions to the coupler 19, and the timing regulator (FIG. 2) compensates for the differences in length between the different feed-in fibers, the buffering in the data buffer 62 in the timing regulator 32 results in the arrival of an encoded traffic data bit from each of the transmitters simultaneously at the optical coupler 19. The OCDMA signals then follow a shared path to the 1×n optical splitter 22, and the receivers 28. The OCDMA signals thus arrive simultaneously at each receiver 28. This leads to the reduction in cross-correlation as seen in FIG. 4 in comparison to FIG. 5, and hence allows each receiver 28 to more reliably ignore signal components which are intended for other receivers.

Depending on the rate of the optical timing signal, and the speed of light in the feed-in branch fibers 16, light will travel a predetermined distance (here referred to as a 'bit-length'), in a clock period. In some cases the difference between the upper bound on the length of the feed-in fiber and the length of a given feed-in fiber will be greater than a bit length. In such a case, the pre-set stored path-length/time offset value need only be enough to bring the data bits from different transmitters into phase with one another (herein referred to as a bit-synchronized system).

In an embodiment with normal clock rates (e.g. 1 GHz), the benefits of synchrony of arrival of encoded traffic data bits at the coupler can thus be achieved with the addition of a delay of less than a clock period (1 ns) in each of the timing regulators 32.

In an alternative embodiment it is possible to provide synchronization not only at bit-level, but also at a protocol level. For example, where the bits are part of a higher-level structure such as a digital frame, cell, packet, hyperframe or the like, the clock recovery and control units might delay the transmission of signals sufficiently to align the protocol structures with one another in addition to aligning the bits with one another. FIG. 4 shows an example (signal 4(*d*)) where $\Delta T_B$ is lengthened by an additional clock period in order to bring the clock signals at transmitter A and transmitter B into protocol-level alignment. In the example shown, a starting pulse of the clock signal is used as a reference point to which the calculated $\Delta T_B$ can be added. In other embodiments, some other form of protocol-level timing signal might be provided.

Because the optical pulse generator 25 adds the timing signal to the shared fiber 20, and because of the bi-directional optical path provided by the k×1 optical coupler 19 and feed-in fibers 16, the same fibers can be used for both transmitting a clock signal to each of the transmission systems, and carrying OCDMA signals from the transmission systems 10 to the shared fiber 20. This provides a synchronous OCDMA network more cheaply than has hitherto been achieved.

In cases where an unsynchronized OCDMA network is already installed, the network operator can cheaply and efficiently upgrade the network to a synchronous OCDMA network by adding an optical pulse generator 25, and a shared circulator 24 to the shared part of the network, and a transmission-side circulator 36, feed-in branch fiber 16 and a timing regulator 32 to each unsynchronized OCDMA transmitter 34. The network operator might choose to upgrade a subset of the asynchronous OCDMA transmitters 34, as this would still increase the number of users who are supported by the network.

In other embodiments, the optical pulse generator 25 and shared circulator 24 could be placed in the same housing as the 1×n optical splitter 22 (the downstream section 20B of the shared fiber then being an internal component of the integrated device).

Figure 6:
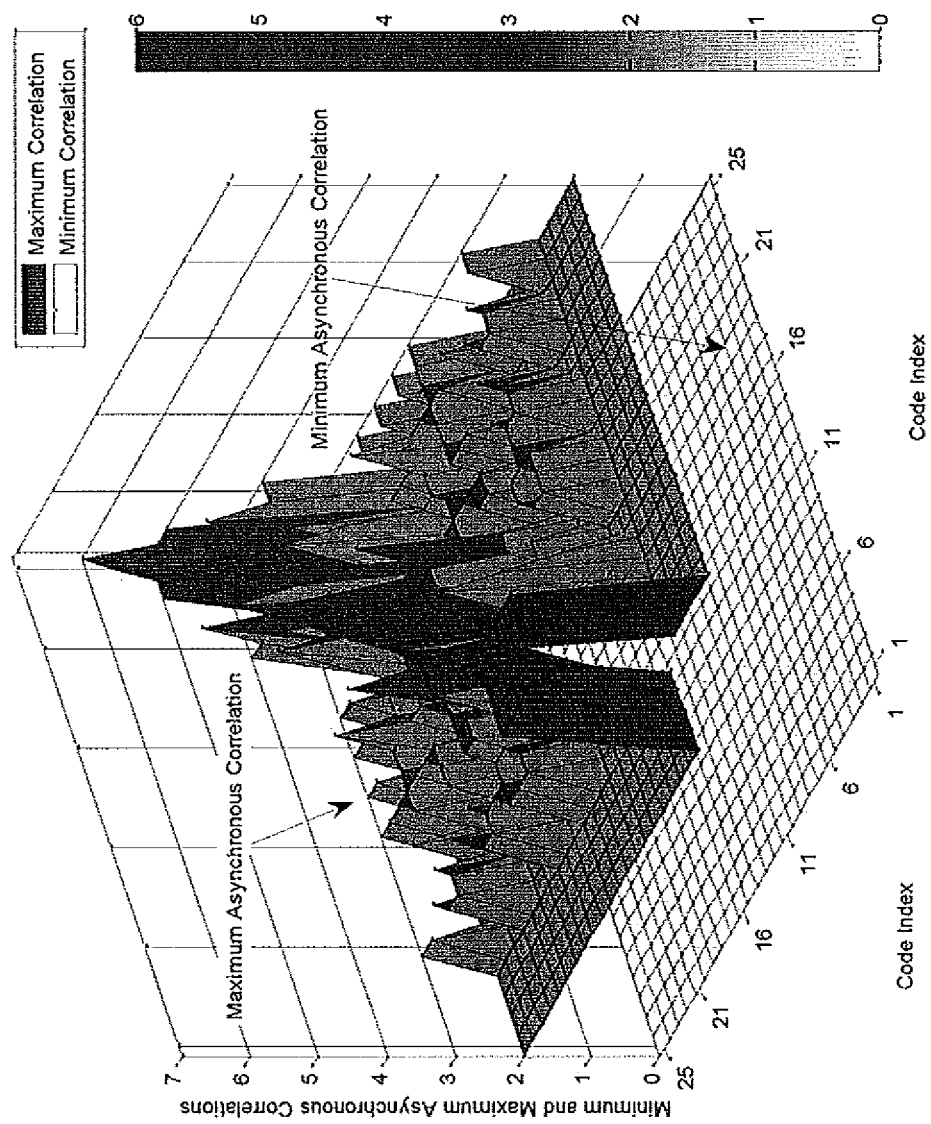
FIG. 6 illustrates the auto-correlation and cross-correlation of the same set of 30-bit codes are not aligned in time.

Other embodiments offer further benefits from the time-alignment of the OCDMA signals in the shared optical fiber. As explained in 'A Novel Multi-User Interference Cancellation Scheme for Synchronous OCDMA Networks' by the inventor and Hooshang Ghafouri-Shiraz in the IEEE Journal of Lightwave Technology, vol. 31, no. 11, Jun. 1, 2013, UC-MPC codes, provided they are time-aligned with one another, have the additional property that the sum of the chip sequences is unique for each possible combination of intended receivers for the combined OCDMA signals. In order to take advantage of this property of UC-MPC codes, in another embodiment, a multi-access interference suppression unit (FIG. 6) is provided which shuts off optical signals to receivers 28 which are not included amongst the intended recipients of the combined OCDMA signals. It is to be noted that sets of orthogonal codes will also have the above property and could be used in place of UC-MPC codes in other embodiments.

In more detail, the multi-access interference suppression unit (FIG. 6) includes the optical circulator 24, and optical pulse generator 25 as discussed in relation to the above embodiments. The 1×n optical splitter 22 is replaced in this embodiment with a 1×(n+1) optical splitter 90. The extra output from the splitter 90 is fed to a local photodetector 92 whose output is monitored by a control unit 94. The control unit 94 is a micro-controller in this embodiment, though in other embodiments a microprocessor might be used instead. Memory 96 associated with the micro-controller stores a look-up table 98. The look-up table 98 lists, for each of the possible combinations of current receivers, the corresponding unique summed code sequence. The micro-controller has an interface to an optical switch (102a-102n) on each of the output lines to the receivers. Each of the optical switches (102a-102n) is preceded by an optical delay line which stores the combined OCDMA signals taken from the shared optical fiber 20 for one clock period.

The micro-controller 94 is controlled by a software or firmware program to find the total energy in the combined signal on the optical fiber 20, and thereby find the number of receivers 28 intended to receive a coded '1' bit in the current clock period. Using that information, and the summed code sequence from the output of the photodetector 92, the micro-controller then accesses the look-up table 98 to find the group of receivers intended to receive a coded '1' bit in the current clock period. Having found the group of intended receivers 28, the micro-controller 94 then controls optical switches 102a to 102n to shut off the optical signal to receivers not included in the group. The optical delay lines (100a-100n) are configured so that the signal present at the optical switches corresponds to the signal on which the receiver group derivation was based.

Figure 7:
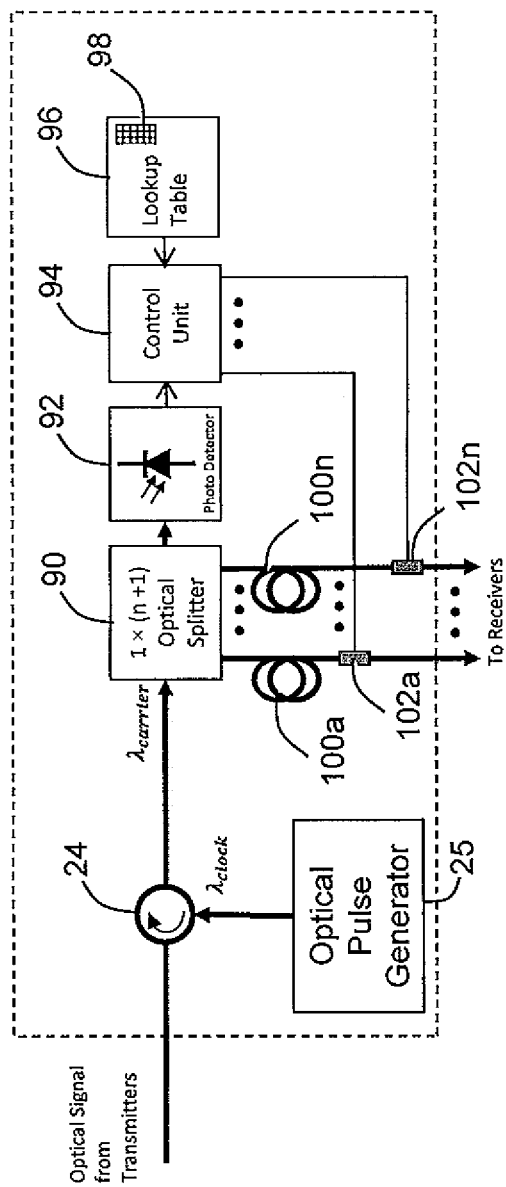
FIG. 7 shows a multi-access interference suppressor included in another embodiment of the present disclosure.
Figure 8:
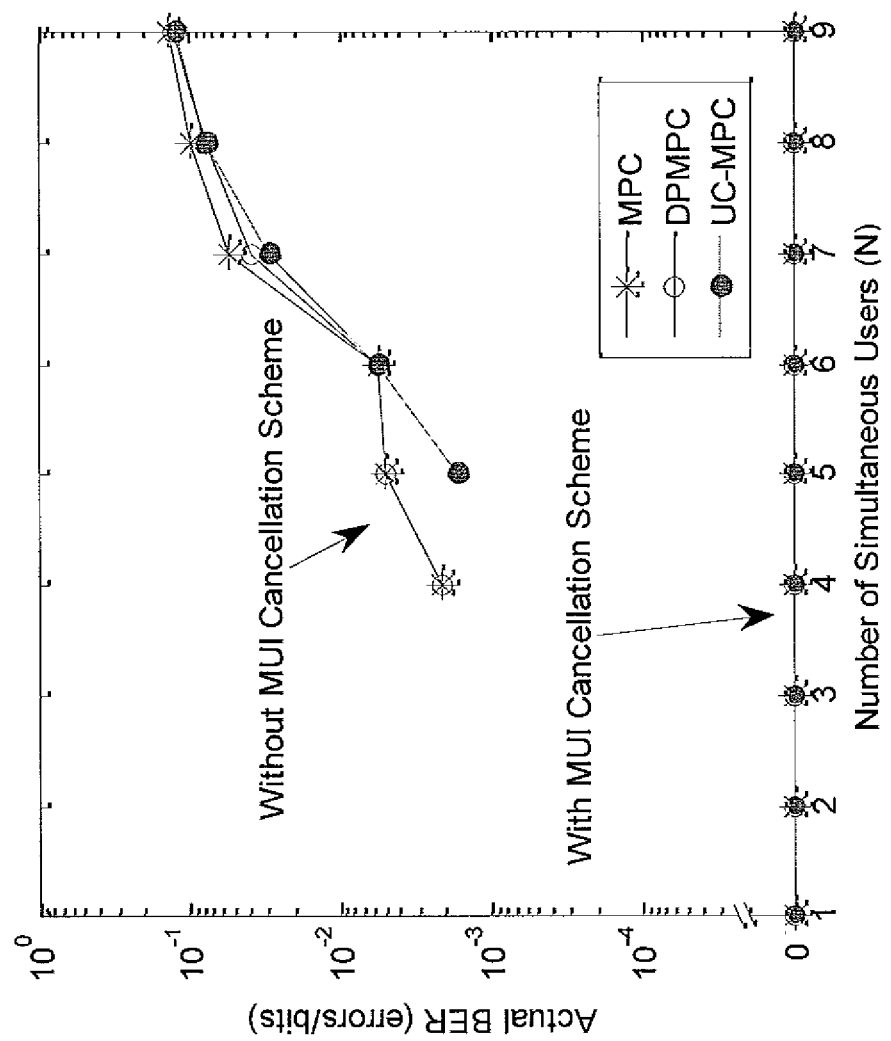
FIG. 8 shows how multi-access interference is reduced in some embodiments.

The use of a multi-access interference suppression unit in this embodiment results in the almost complete cancellation of the effects of multi-access interference, as can be seen from FIG. 7. This in turn increases the number of users who can simultaneously use the communications network.

It will be seen how the addition of just one unit to the shared communications medium (the multi-access interference suppression unit) and the addition of a feed-in branch fiber 18, circulator 36 and timing regulator 32 to each existing unsynchronized CDMA transmitter 34, provides a way of upgrading an installed unsynchronized CDMA network to a synchronized CDMA network offering a markedly improved performance.

As well as showing the results for the UC-MPC codes used in the above embodiments, the graph (FIG. 7) shows impressive improvements for other prime code families as well. In order to use Modified Prime Code (MPC), new MPC (n-MPC) or Double-Padded Modified Prime Code (DP-MPC), in a yet further embodiment, an additional network element—a code enhancement unit—is added to the network. The code enhancement unit has an additional input into the optical coupler 19 (which thus becomes a (k+1)×1 optical coupler). The traffic data for each of the transmission systems 10 is additionally passed to the code enhancement unit which then calculates a differentiating code sequence to be added to the encoded traffic data symbols generated by the transmission systems 10 to render the sum of the encoded traffic data symbols unique even for codes which do not normally exhibit this property. The code enhancement unit then adds a 1.55 μm signal modulated with the differentiating code sequence to the input of the optical coupler 19. The code enhancement unit is synchronized in the same way as the transmitters are synchronized in the above-described embodiments.

A method of deriving the necessary differentiating code sequence is presented in 'A Novel Multi-User Interference Cancellation Scheme for Synchronous OCDMA Networks' by the inventor and Hooshang Ghafouri-Shiraz in the IEEE Journal of Lightwave Technology, vol. 31, no. 11, Jun. 1, 2013.

In other embodiments, each of the transmission systems 10 benefit from a synchronization system which provides each transmitter with a synchronous timing signal—i.e. the timing signals in the transmission systems are in phase with one another. As an example, an embodiment might involve a modification of the above embodiment in which each transmission system further includes a clock signal delay unit which delays the clock signal by a time complementary to the time taken for the clock signal to travel over the feed-in fiber. As another example, each transmission system might be further provided with a Global Positioning System receiver and extract a common timing signal therefrom. As yet another example, each transmission system could be provided with an atomic clock of sufficient precision and stability to maintain synchronization once synchronized with the other transmission systems as part of a synchronization procedure.

Where such a synchronization system is present, the path length offset value stored in the store 58 need only compensate for the transmission delay from the transmission system 10 to the coupler 19.

Possible variations on the above embodiments include (this list is by no means exhaustive):
  i) instead of each transmitter including a pre-set delay value store, the transmitters might access a shared store storing the pre-set delay values for a plurality of transmitters;
  ii) the delay value might instead be stored as a length value, or a relative length deficit value;
  iii) instead of the time offset being a delay value, it might be a timing advance value which is subtracted from some fixed delay which would otherwise be imposed in the transmitter;
  iv) whilst Optical Time Delay Reflectometry was used in the above embodiment to measure the round trip delay, in other embodiments, the length of the feed-in fiber could be taken from maps or network records and the value in the store 58 configured accordingly;
  v) whilst the above embodiment described the use of Direct Sequence Spread Spectrum encoding, in other embodiments frequency-hopping and/or time-spreading code division multiple access techniques could be used instead;
  vi) the transmitters and receivers in the above embodiments could be components of transceivers;
  vii) in the above-described embodiments, the feed-in fibers all met at the optical coupler. In other embodiments, the coupling of the various feed-in fibers might occur in stages, so that the feed-in fibers have a tree-like topology with the shared optical fiber 20 forming the trunk and a plurality of optical couplers providing the divergence points at which the feed-in fibers branch outwards towards the transmitters. In other embodiments, the optical splitter 22 might be replaced by a plurality of splitters, thus forming a tree-like topology on the receiver-side of the network also;
  viii) in other embodiments, the timing signal might be an occasional signal output by the optical signal generator, rather than a periodic signal. The transmitters might then include local oscillators which enable them to stay synchronization with one another until the arrival of the next timing signal. In some embodiments, the timing signal might be output by the optical signal generator in response to a request for a timing signal issued by one of the transmitters;
  ix) in the above embodiments, the data traffic signals were encoded with a code specific to the intended receiver, in other embodiments, the code might be a code specific to the transmitter which is communicated to the intended receiver. Other code agreement protocols will be known to those skilled in the art;
  x) although optical signals and optical fibers were used in the above embodiments, in other embodiments, electrical signals or Radio-Frequency signals might be used in wires or waveguides (for example a co-axial cable), respectively.

In summary of the above disclosure, a fixed communication network is disclosed in which a plurality of transmitters feed signals via tributary transmission lines of different lengths onto a shared network component. A timing reference signal is distributed to the transmitters. The shared network component in some embodiments takes the form of a transmission line. In order to enable the sharing of the capacity of the shared network component, each of the plurality of transmitters codes data for transmission in accordance with a code division multiple access scheme. The efficiency of usage of the shared network component is improved by synchronizing the arrival of the encoded bits at the shared network component. This is achieved by populating a store within each transmitter with a pre-set timing offset, and timing the transmission of data in accordance with the timing reference signal received by the transmitters and the pre-set timing offset.

The invention claimed is:
1. A fixed network comprising:
a trunk transmission line;
a plurality of tributary transmission lines, wherein a length of at least one of the tributary transmission lines is different from the other tributary transmission lines;
one or more signal couplers operable to couple the plurality of tributary transmission lines and the trunk transmission line; and
a plurality of transmitters each being operable to transmit a traffic data signal onto one of the tributary transmission lines, the traffic data signal representing traffic data symbols encoded in accordance with a code division multiple access (CDMA) coding scheme, each transmitter having access to a network timing signal and comprising a pre-set time offset store storing a pre-set time offset related to a measured signal travel time within the network specific to the respective transmitter, wherein each of the transmitters is arranged in operation to transmit the traffic data signals onto the tributary transmission line at a time dependent upon the network timing signal and the pre-set time offset stored in the pre-set time offset store, to synchronize the encoded traffic data symbols on the trunk transmission line.

2. A network according to claim 1 wherein the trunk transmission line comprises a trunk optical fiber, the one or more signal couplers comprise optical couplers and the tributary transmission lines comprise tributary optical fiber.

3. A network according to claim 1 wherein the network timing signal comprises a clock signal.

4. A network according to claim 3 wherein a rate of the clock signal is equal to a symbol rate of the traffic to be encoded by each of the transmitters.

5. A transmission system for use in a fixed communications network which has a plurality of tributary transmission lines coupled by one or more signal couplers to a trunk transmission line, a length of at least one of the tributary transmission lines being different from the other tributary transmission lines, the transmission system comprising:
a modulator for transmitting a traffic data signal, representing traffic data encoded in accordance with a code division multiple access (CDMA) coding scheme, on one of the plurality of tributary transmission lines;
a pre-set time offset store storing a pre-set time offset related to a measured signal travel time within the fixed communications network for the transmission system; and
a timing regulator having access to the pre-set time offset store, the timing regulator being operable to control the transmission system to output the traffic data signal at a time dependent on a network timing signal and the pre-set time offset stored in the pre-set time offset store.

6. A transmission system according to claim 5 further comprising an encoder operable to encode traffic data symbols in accordance with a code division multiple access coding scheme.

7. A transmission system according to claim 6 wherein the timing regulator is arranged to receive the traffic data symbols and to delay the input of the traffic data to the encoder to a time dependent upon the network timing signal and the pre-set time offset stored in the pre-set time offset store.

8. A transmission system according to claim 7 wherein the timing regulator comprises:
a buffer; and
a buffer controller arranged in operation to buffer traffic data symbols until a time dependent upon the network timing signal and the pre-set timing offset, whereupon the traffic data symbols are passed to the encoder.

9. A timing regulator for use in association with one of a plurality of transmitters in a fixed communications network comprising a trunk transmission line, a plurality of tributary transmission lines, wherein a length of at least one of the tributary transmission lines is different from the other tributary transmission lines, and one or more signal couplers operable to couple the plurality of tributary transmission lines and the trunk transmission line, the transmitter being operable to transmit a traffic data signal onto one of the tributary transmission lines, the traffic data signal representing traffic data symbols encoded in accordance with a code division multiple access coding scheme, the timing regulator comprising:
a traffic data signals input interface;
a traffic data signals output interface;
a timing signal input interface; and
a pre-set time offset store storing a pre-set time offset related to a measured signal travel time within the fixed communications network for the transmitter,
wherein the timing regulator receives a network timing signal via the timing signal input interface, and is operable to receive input traffic data signals via the input interface and to control the transmitter to output traffic data signals from the traffic data signals output interface at a time dependent on the network timing signal and the pre-set time offset stored in the pre-set time offset store to synchronize the encoded traffic data symbols on the trunk transmission line.

10. A timing regulator according to claim 9 further comprising:
a traffic data buffer; and
a traffic data buffer controller arranged in operation to buffer traffic data for an amount of time dependent upon the network timing signal received via the timing signal input interface and the pre-set time offset, before transmitting the traffic data from the traffic data signals output interface.

* * * * *